US008817774B2

(12) United States Patent
Mathur et al.

(10) Patent No.: US 8,817,774 B2
(45) Date of Patent: Aug. 26, 2014

(54) INTEGRATED SET-TOP BOX DSL VOIP WIFI DEVICE

(75) Inventors: Mohit Mathur, Olathe, KS (US); Michael P. Morrissey, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 827 days.

(21) Appl. No.: 11/824,087

(22) Filed: Jun. 29, 2007

(65) Prior Publication Data

US 2009/0003386 A1    Jan. 1, 2009

(51) Int. Cl.
*H04L 12/66* (2006.01)
*H04N 7/173* (2011.01)

(52) U.S. Cl.
USPC ............ 370/352; 370/401; 725/110; 725/131

(58) Field of Classification Search
None
See application file for complete search history.

(56) References Cited

U.S. PATENT DOCUMENTS

| | | | |
|---|---|---|---|
| 6,081,533 A * | 6/2000 | Laubach et al. | 370/421 |
| 6,285,685 B1 * | 9/2001 | Bum | 370/474 |
| 6,448,899 B1 | 9/2002 | Thompson | |
| 6,466,573 B1 * | 10/2002 | Renucci | 370/352 |
| 6,493,875 B1 * | 12/2002 | Eames et al. | 725/81 |
| 6,526,581 B1 * | 2/2003 | Edson | 725/74 |
| 6,535,983 B1 | 3/2003 | McCormack | |
| 6,640,239 B1 * | 10/2003 | Gidwani | 709/203 |
| 6,640,335 B2 | 10/2003 | Ebisawa | |
| 6,678,362 B2 * | 1/2004 | Hong et al. | 379/102.03 |
| 6,791,993 B2 * | 9/2004 | Foley | 370/430 |
| 6,986,071 B2 | 1/2006 | Darshan et al. | |
| 7,139,283 B2 | 11/2006 | Quigley et al. | |
| 7,154,381 B2 | 12/2006 | Lang et al. | |
| 7,324,542 B2 | 1/2008 | Furlong et al. | |
| 7,489,849 B2 | 2/2009 | Reagan et al. | |
| 7,505,748 B2 | 3/2009 | McCarthy et al. | |

(Continued)

OTHER PUBLICATIONS

"IEEE Std 802.3af™—2003", IEEE Computer Society, Jun. 18, 2003. (12 pages.

(Continued)

*Primary Examiner* — Steven H Nguyen
(74) *Attorney, Agent, or Firm* — Swanson & Bratschun, L.L.C.

(57) ABSTRACT

An integrated Set-Top Box DSL VOIP WIFI device including a housing; a telecommunications line input for accepting a telecommunications line containing a video content signal and a data content signal from a provider, the data content signal for providing the voice over internet protocol to a telecommunication's device; a virtual local area network for splitting the video content signal and the data content signal; a video output for accepting a video line for transmitting the video content signal to a video device; a data output for accepting an audio line for transmitting the data content signal to at least one of a telecommunications device and a digital computing device; an antenna for transmitting the data content signal to a wireless communications device; and a passive pass-through filter for connection for providing transmission of E911 service voice signals.

17 Claims, 2 Drawing Sheets

(56) References Cited

U.S. PATENT DOCUMENTS

| | | |
|---|---|---|
| 2001/0000826 A1 | 5/2001 | Bellamy |
| 2002/0162116 A1 | 10/2002 | Read et al. |
| 2003/0014757 A1* | 1/2003 | Craven et al. .................... 725/80 |
| 2003/0035471 A1* | 2/2003 | Pitsoulakis ................... 375/222 |
| 2003/0217368 A1* | 11/2003 | Ramaswamy ................ 725/131 |
| 2004/0107445 A1 | 6/2004 | Amit |
| 2004/0151289 A1* | 8/2004 | Phillips et al. ............. 379/93.05 |
| 2004/0264700 A1 | 12/2004 | Kirkland |
| 2005/0022247 A1 | 1/2005 | Bitran et al. |
| 2005/0078690 A1* | 4/2005 | DeLangis .................... 370/401 |
| 2005/0089052 A1* | 4/2005 | Chen et al. .................... 370/401 |
| 2005/0097369 A1 | 5/2005 | Bowser et al. |
| 2005/0197094 A1 | 9/2005 | Darshan et al. |
| 2006/0049818 A1 | 3/2006 | Montgomery |
| 2006/0164098 A1 | 7/2006 | Su |
| 2008/0165781 A1 | 7/2008 | Voit et al. |
| 2008/0175260 A1 | 7/2008 | Hussain et al. |
| 2009/0007211 A1 | 1/2009 | Mathur et al. |

OTHER PUBLICATIONS

"Data-Over-Cable Service Specifications. Radio Frequency Interface Specification SP-RFI-104-980724," Interim Specification (Superseded); Cable Television Laboratories, Inc., 1997 (208 pages).
Non-Final Action date mailed Jan. 21, 2010 in U.S. Appl. No. 11/824,261.
Non-Final Action date mailed Jul. 23, 2009 in U.S. Appl. No. 11/824,069.
Response filed Oct. 20, 2009 to Non-Final Action date mailed Jul. 23, 2009 in U.S. Appl. No. 11/824,069.
Final Action date mailed Jan. 13, 2010 in U.S. Appl. No. 11/824,069.
Amendment filed Mar. 4, 2010 to Non-Final Rejection date mailed Jan. 21, 2010 in U.S. Appl. No. 11/824,261.
Response filed Mar. 4, 2010 to Final Action date mailed Jan. 13, 2010 in U.S. Appl. No. 11/824,069.
RCE filed Mar. 8, 2010 in U.S. Appl. No. 11/824,069.
Final Action date mailed Jun. 7, 2010 in U.S. Appl. No. 11/824,261.

* cited by examiner

INTEGRATED SET-TOP BOX DSL VOIP WIFI DEVICE

FIELD OF THE INVENTION

The field of the invention is directed to a DSL set-top box including a tuner for receiving video and data over a DSL line, more particularly, the present invention relates to an digital subscriber line integrated set-top box for voice over internet protocol and wireless-fidelity communications.

BACKGROUND OF THE INVENTION

Today, video set-top boxes support digital feeds from telecommunications companies providing video program content to a user's television or other electronic video displaying device. When a user wishes to utilize data transmissions, such as for Internet access, separate devices are used to provide such access. Further, if users further wish to utilize Internet-enabled phones, such as an analog phone through voice over internet protocol ("VOIP") services; these too require a separate device. Typically, a digital subscriber line ("DSL") modem is required for the internet data connection and an integrated access device ("IAD") is required for the VOIP service. Thus, a user desiring to utilize a VOIP phone, view video content, access digital data on a broadband connection with their computer, and make calls using an analog telephone, must spend resources to acquire these several different pieces of electronic equipment to provide such services and functionality.

In some situations, the VOIP service may be available on the DSL (VDSL or ADSL 2+) modem. Also, in many scenarios, a customer uses a separate wireless router inside the home for internet connectivity, this wireless router may or may not include the DSL modem. Some VDSL 2 modems have started integrating the VOIP and WIFI services, but not the video set-top box functionality.

SUMMARY

The Integrated Set-Top Box DSL VOIP WIFI Device ("integrated DSL set-top device") simplifies the service delivery to the consumer and the number of electronic devices that they are required to have or buy to provide all of these services. The integrated DSL set-top device is provided to the consumers by a telephone company to bundle voice, video, and internet data services for providing signals and content to the user's televisions, computers, and analog phones. The integrated DSL set-top device operates using internet protocol ("IP") and has an IP address assigned to it from the telephone company or telecommunications company service provider. The integrated DSL set-top device will have at least one analog phone RJ-11 (ports) and will support cord or cordless home phone units. A first RJ-11 analog phone port provides the lifeline (E911) service and works during power outages through a passive pass-through connection. The second RJ-11 analog phone port provides the VOIP service to the user's VOIP phone(s).

The integrated DSL set-top device also has a physical Ethernet RJ-45 (data port) and to provide the wireless 802-11B/G (router service) for internet access to a user's wireless computing devices. The coaxial port on the device provides a connection point for the video feed to the television. The video service is delivered to the integrated DSL set-top device over an IP multicast stream from the service provider. The internet access and phone service is provided over IP unicast. The consumer has the option of using the telephone company's VOIP service or any other VOIP provider. The VOIP provider option can be configured in the IAD of the integrated DSL set-top device using the Ethernet port. The integrated DSL set-top device provides aggregation for services on a single customer premise equipment/device ("CPE"). The integrated DSL set-top device also supports plain old telephone service ("POTS") for an analog phone. In one aspect, the service separation is achieved using the frequency separation for the digital data and the traditional land line POTS service.

The DSL technology uses standard discrete multi-tone modulation (DMT)/quadrature amplitude modulation (QAM) techniques for encoding data across radio frequencies. The data is sent at high frequencies, approximately 30 kHz up to 30 MHz for VDSL 2 over the copper pair going to the consumer and voices sent over lower frequencies, approximately 3.4 kHz. or below on the same physical circuit.

The data frequency carries traffic for internet, VOIP, and video. The services are logically separated through the use of two Ethernet virtual local area networks ("VLAN"). The internet and VOIP traffic is carried in one VLAN, while the video traffic uses a separate VLAN. Additionally, a pass-through filter is used to providing an analog telephone signal to an analog telephone.

An integrated Set-Top Box DSL VOIP WIFI device including a housing; a telecommunications line input for accepting a telecommunications line containing a video content signal and a data content signal from a provider, the data content signal for providing the voice over internet protocol to a telecommunication's device; a virtual local area network ("VLAN") for splitting the video content signal and the data content signal; a video output for accepting a video line for transmitting the video content signal to a video device; a data output for accepting an audio line for transmitting the data content signal to at least one of a telecommunications device and a digital computing device; an antenna for transmitting the data content signal to a wireless communications device; and a passive pass-through filter for connection for providing transmission of E911 service voice signals.

DETAILED DESCRIPTION OF THE DRAWINGS

Figure 1:
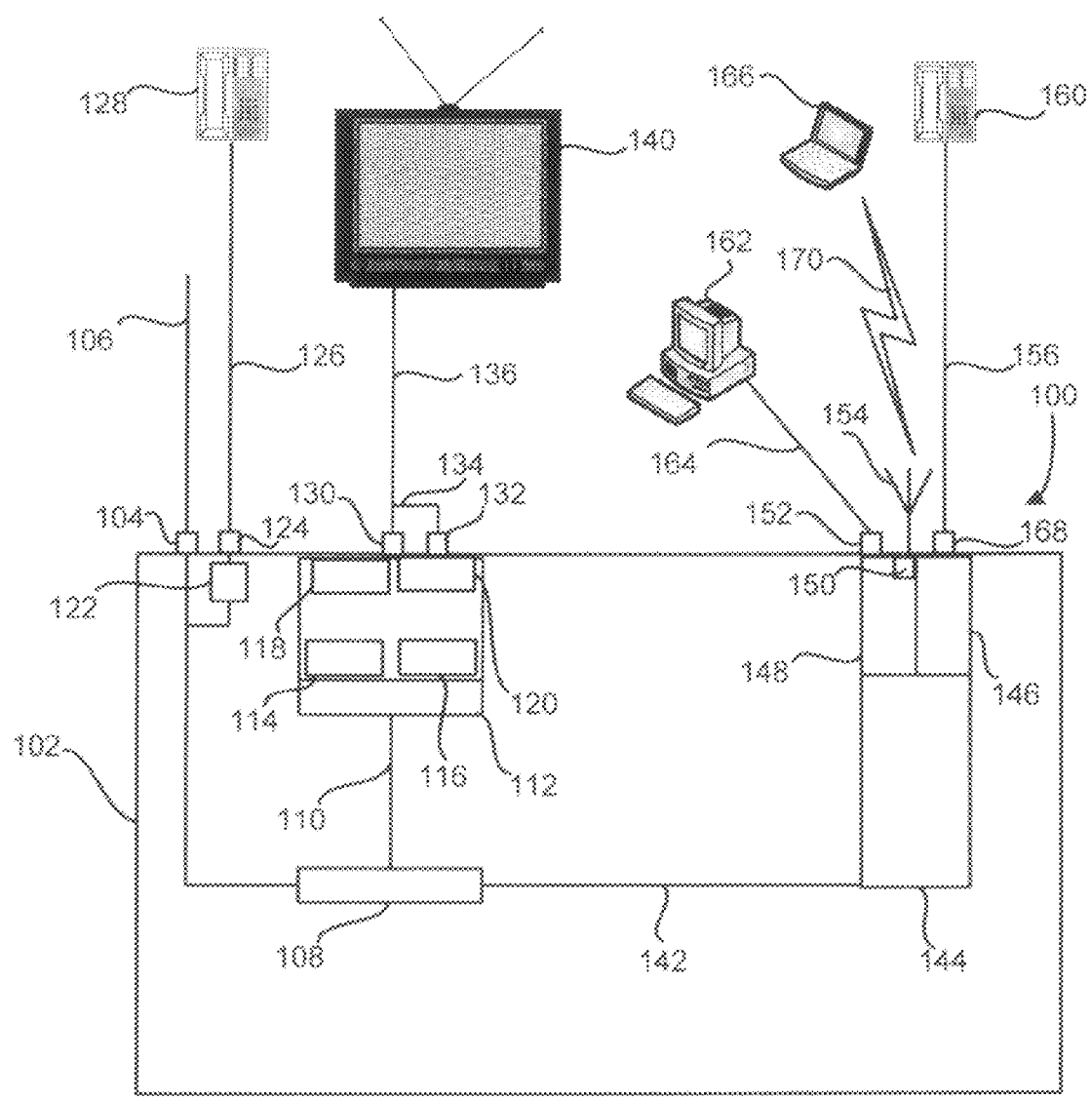
FIG. 1 illustrates a block diagram of an exemplary integrated DSL set-top device according to an embodiment of the present invention.

In the drawings, like or similar elements are designated with identical reference numerals throughout the several views and figures thereof, and various depicted elements may not be drawn necessarily to scale. For example, for viewing convenience, the integrated DSL set-top device is enlarged in FIG. 1 relative to the electronic peripheral devices also shown.

FIG. 1 illustrates an embodiment 100 of the integrated DSL set-top device. In one embodiment, the integrated DSL set-top device 100 includes a housing 102, a telecommunications jack 104 for inputting a telecommunications line 106 carrying the digital signals for the integrated DSL set-top device 100. The telecommunications line 106 is connected to the very high speed digital subscriber line 2 (VDSL2) 108. Telecommunications line 106 enters the housing 102 and is split into a tuner feed 110 and a telephone feed 142.

Integrated DSL set-top device 100 may also include a tuner 112 in communication with tuner feed 110. The tuner 112 operates in accordance with that commonly known to those skilled in the art. In addition, it may also include video decoder 114, digital signal processor ("DSP") 116, video digital to analog converter ("video DAC") 118, and audio coder-decoder ("audio codec") 120. Output of video DAC 118 may be to a video jack 130. An output of audio codec 120 may be to an audio jack 132. Typically, left and right ("L/R") audio line 134 maybe connected to audio jack 132 and separately connected to television 140 or incorporated into the television feed 136, exiting the video jack 130 prior to being connected to the television 140.

Integrated DSL set-top device 100 may further include Dynamic Host Configuration Protocol (DHCP) unit 144 in connection with phone feed 142 and DSP 148 and analog to digital converter codec ("ADC codec") 146. DSP 148 and ADC codec 146 may be in communication with phone jack 168 that is in communication with telephone line 156, connecting the analog telephone 160 to the integrated DSL set-top device 100.

The IP layer may support the following standard: TCP, UDP, SNMP, ICMP, DHCP, ARP, and RARP to work in conjunction with the Ethernet layer. Other protocols like HTTP, TFTP, and FTP maybe required for standard data applications such as internet browsing, file transfer, etc.

The integrated DSL set-top device 100 may also include standard circuitry for interconnecting the various electronic elements and units described herein. The VOIP signaling may be compatible with standard H.323 and/or SIP. The voice traffic is differentiated from the data traffic by the information in OSI model layers 3 and 4 header of the data packets transmitted through the telecommunications line 106. The IP address in layer 3, along with the SIP destination helps in routing of the voice traffic to the appropriate soft/call server. The circuitry of the integrated DSL set-top device 100 provides connection to a regular analog phone using a RJ-11 port designed for VOIP. It may have an ADC to convert voice signals into digital bits. It also may have the DSP function within its circuitry with DTMS detection and generation function. Standard codec circuitry may also be included in the circuitry of the integrated DSL set-top device 100 to provide support for G.711, G.726, and G.729 voice service.

Both the MPEG data packets and the digitized data packets may then be modulated and multiplexed according to a TDMA protocol, or some other protocol at the telecommunication's company to form an MPEG transport stream for transmission along or through a telecommunications line 106. The MPEG transport stream may then be demultiplexed into data streams containing either MPEG data or digitized data by the integrated DSL set-top device 100. The tuner 112 tunes or selects a single downstream channel from the plurality of downstream channels transmitted by means well known in the art. In an embodiment of the present integrated DSL set-top device 100, the tuner 112 may select that single downstream channel in which the digitized data is contained.

The video signal adheres to National Television Standards Committee (NTSC) in North America or phase alternating line (PAL) international analog specifications, along with Advanced Television Systems Committee (ATSC) in North America and digital video broadcasting (DVB) international digital specifications standards.

The MPEG data is demultiplexed from the same MPEG transport stream that carries the digital data by a demultiplexer and transmitted to video decoder 114 in communication with the DSP 116. This signal is then sent to the audio codec 120 and video DAC 118 for transmitting through video jack 130 and audio jack 132 for transmission through television line 136 to television 140. The output from the video DAC 118 will carry the TV video signal's standard/high definition, RGB composite and S Video. The output from the audio codec 120 will carry the audio signals left and right.

In one embodiment, the filtered unicast data from each filter may then be transmitted to a corresponding multiplexer. The time division multiplexes the MPEG compressed video data with the filtered data to a corresponding downstream channel for transmission over the telecommunications line 106. Other means of this function may be achieved through a statistical multiplexer that allocates shares of the available downstream transmission bandwidth dynamically.

The DHCP 144 of the present integrated DSL set-top device 100 may contain a set of rules used by communications devices such as computers, routers, and network adapters to allow the device to request and obtain an IP address from a server. The DHCP 144 is a protocol used by network computers to obtain IP addresses and other parameters such as the default gateway subnet mask and IP addresses of DNS servers from a DHCP server. In one embodiment, when the integrated DSL set-top device 100 is turned on, the DHCP 144 sends out a query requesting a response from a DHCP server on the service provider network and it will also act as a DHCP server for computers connected to the locally and wirelessly attached networks.

As discussed above, the integrated DSL set-top device 100 will support IP layer and will also support standard Transmission Control Protocol ("TCP"), User Datagram Protocol ("UDP"), Simple Network Management Protocol ("SNMP"), Internet Control Message Protocol ("ICMP"), DHCP, Address Resolution Protocol ("ARP"), Reverse Address Resolution Protocol ("RARP"). In addition, other protocols like Hypertext Transfer Protocol ("HTTP"), Trivial File Transfer Protocol ("TFTP"), and File Transfer Protocol ("FTP").

The DSP 148 functions along with Dual Tone Multi-Frequency (DTMF) detection and generation functions. In addition, the ADC codec 146 includes circuitry to provide support for G.711, ITU standard G.726, and G.729 ITU standards for audio companding.

In addition to the above, the outputs of DHCP 144 may include a computer jack 152 in communication with a computer 162 via computer connection 164. DHCP 144 may include a driver that supports preferably 802.3(CSMA/CD) framing. The integrated DSL set-top device 100 further supports standard IEEE framing for 802.3 10 base-T, 100 base-TX, and 1000 base-T specifications. The internet protocol IP layer will have to support standard TCP, UDP, SNMP, ICMP, DHCP, ARP, RARP to work in conjunction with the Ethernet layer. Other protocols, like hyper text transfer protocol ("HTTP"), trivial file transfer protocol ("TFTP") and file transfer protocol ("FTP") will be required for standard data applications such as internet browsing, file transfer, etc.

The integrated DSL set-top device 100 includes a WIFI/WLAN (wireless LAN) support for 802.11A/B/G to provide using industry standard chip sets, such as WIFI chip set 150. The integrated DSL set-top device 100 may be an access point to send and receive the data traffic to users over the wireless communication link 170, as shown between laptop 166 and the antenna 154 of the integrated DSL set-top device 100. The WIFI network may operate over the unlicensed spectrum at 2.4 GHz. (802.11B/G) and 5 GHz. (802.11A/H) providing data rates of 11 Mbps on 802.11D and 54 Mbps on 802.11A or G. The orthogonal frequency division multiplexing ("OFDM") modulation technique is used by 802.11A and G, while 802.11B uses direct sequence spread spectrum ("DSSS"). The ADC codec 146 supplies VOIP signals to the analog telephone 160.

In addition, the DSL STB with VOIP 100 may further include a pass-through filter 122 for passing through low frequency wire line voices carried on the telecommunications line 106. The voice frequency carries the traditional (GR-303) voice traffic for POTS. The passive pass-through is required to ensure that the land line phone works in the event of power failure to the device. The telephone 128 is connected to the telephone jack 124, such as a traditional RJ-11 voice port. The POTS circuit will support the familiar Borscht functions of battery feed, over-voltage protection, ringing, supervision, codec, hybrid, and testing.

Figure 2:
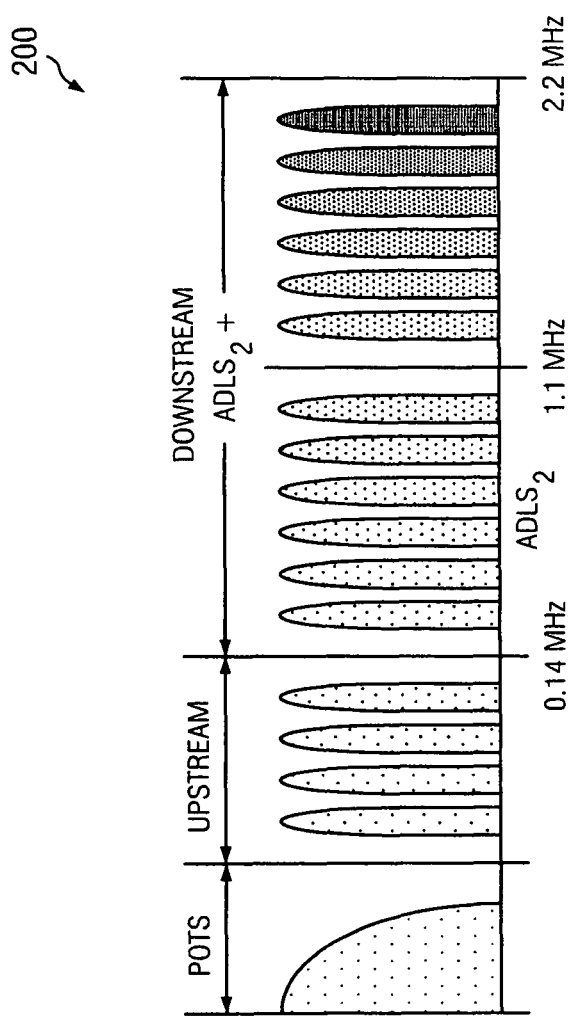
FIG. 2 illustrates a graphical representation of the different bandwidths of the different signals of the integrated DSL set-top device according to one embodiment of the present invention.

FIG. 2 illustrates a graphical representation depicting the wavelength frequencies for each of the different data, video, and voice signals of the integrated DSL set-top device 100.

There has been described an integrated DSL set-top device. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, different types and numbers of switches may be used without departing from the inventive concepts.

What is claimed:

1. An integrated Set-Top Box DSL VOIP WIFI device comprising:
   a housing;
   a telecommunications line input for accepting a telecommunications line containing a video content signal and a data content signal from a provider, said data content signal for providing said voice over internet protocol to a telecommunication's device;
   a virtual local area network for splitting said video content signal and said data content signal;
   a video output for accepting a video line for transmitting said video content signal to a video device;
   a data output for accepting an audio line for transmitting said data content signal to at least one of a telecommunications device and a digital computing device;
   an antenna for transmitting said data content signal to a wireless communications device;
   a passive pass-through filter for connection for providing transmission of E911 service voice signals, said passive pass-through filter being enclosed within said housing; and
   a telephone jack in communication with said passive pass-through filter and configured to enable voice signals to be communicated to a telephone powered by said telecommunications line input and via said telephone jack.

2. The integrated Set-Top Box DSL VOIP WIFI device of claim 1 further comprising a tuner for selecting a particular video content signal.

3. The integrated Set-Top Box DSL VOIP WIFI device of claim 1 further comprising at least one of a digital signal processor and analog to digital converter codec for processing said data content signal.

4. The integrated Set-Top Box DSL VOIP WIFI device of claim 1 wherein said virtual local area network further differentiates said data content signal and said video content signal based on the header information contained in one of the layer 3 and layer 4 of the OSI model data packets containing said data content signal and said video content signal.

5. The integrated Set-Top Box DSL VOIP WIFI device of claim 1 wherein said virtual local area network further includes time division multiple access protocols.

6. The integrated Set-Top Box DSL VOIP WIFI device of claim 1 further comprising an electronic unit operating under dynamic host configuration protocol for processing said data content signal.

7. The integrated Set-Top Box DSL VOIP WIFI device of claim 1 further comprising at least one of a Quadrature Amplitude Modulation encoder and decoder.

8. The integrated Set-Top Box DSL VOIP WIFI device of claim 1 further comprising circuitry for interconnecting said coaxial input, said virtual local area network, said video output, and said data output.

9. The integrated Set-Top Box DSL VOIP WIFI device of claim 1 wherein said provider is a telecommunications operator.

10. An integrated Set-Top Box DSL VOIP WIFI device comprising:
    a housing;
    an input means for accepting a telecommunications line containing a video content signal and a data content signal from a provider, said data content signal for providing said voice over internet protocol to a telecommunication's device;
    a virtual local area network means for splitting said video content signal and said data content signal;
    a video output means for accepting a video line for transmitting said video content signal to a video device;
    a data output means for accepting an audio line for transmitting said data content signal to at least one of a telecommunications device and a digital computing device;
    an antenna means for transmitting said data content signal to a wireless communications device;
    a filter means for providing transmission of E911 service voice signals, said passive pass-through filter being enclosed within said housing; and
    a connection means in communication with said filter means and configured to enable voice signals to be communicated to a telephone powered by said input means and via said connection means.

11. The integrated Set-Top Box DSL VOIP WIFI device of claim 10 further comprising a means for tuning a particular video content signal.

12. The integrated Set-Top Box DSL VOIP WIFI device of claim 10 further comprising a means for processing said data content signal.

13. The integrated Set-Top Box DSL VOIP WIFI device of claim 10 further comprising a means for converting an analog signal to a digital signal for processing said data content signal.

14. The integrated Set-Top Box DSL VOIP WIFI device of claim 10 wherein said virtual local area network means further differentiates said data content signal and said video content signal based on the header information contained in one of the layer 3 and layer 4 of the OSI model data packets containing said data content signal and said video content signal.

15. The integrated Set-Top Box DSL VOIP WIFI device of claim 10 wherein said virtual local area network means further includes time division multiple access protocols.

16. The integrated Set-Top Box DSL VOIP WIFI device of claim 10 further comprising a means for processing said data content signal under an electronic unit operating under dynamic host configuration protocols.

17. The integrated Set-Top Box DSL VOIP WIFI device of claim 10 further comprising at least one of means for encoding and means for decoding using Quadrature Amplitude Modulation.

* * * * *